United States Patent
Tribotte

(10) Patent No.: US 6,386,568 B1
(45) Date of Patent: May 14, 2002

(54) BICYCLE REAR SUSPENSION

(75) Inventor: Pascal Tribotte, Paris (FR)

(73) Assignee: Renault Sport, Viry-Chatillon (FR)

( * ) Notice: Subject to any disclaimer, the term of this patent is extended or adjusted under 35 U.S.C. 154(b) by 0 days.

(21) Appl. No.: 09/403,036

(22) PCT Filed: Apr. 24, 1998

(86) PCT No.: PCT/FR98/00821

§ 371 Date: Nov. 29, 1999

§ 102(e) Date: Nov. 29, 1999

(87) PCT Pub. No.: WO98/49046

PCT Pub. Date: Nov. 5, 1998

(30) Foreign Application Priority Data

Apr. 25, 1997 (FR) .......................................... 97 05128

(51) Int. Cl.⁷ ............................................. B62K 25/28
(52) U.S. Cl. ....................................................... 280/284
(58) Field of Search ................................ 280/283, 284, 280/285, 288, 281.1, 286, 275

(56) References Cited

U.S. PATENT DOCUMENTS

| | | | |
|---|---|---|---|
| 423,471 A | * | 3/1890 | Easthope |
| 1,016,042 A | * | 1/1912 | Shelton |
| 3,931,990 A | | 1/1976 | Knapp |
| 5,217,241 A | | 6/1993 | Girvin |
| 5,306,036 A | * | 4/1994 | Busby ................ 280/284 |
| 5,409,249 A | | 4/1995 | Busby |
| 5,553,881 A | * | 9/1996 | Klassen et al. ......... 280/284 |
| 5,678,837 A | * | 10/1997 | Leitner ................ 280/284 |
| 5,725,227 A | * | 3/1998 | Mayer ................ 280/284 |
| 6,056,307 A | * | 5/2000 | Busby et al. ............ 280/284 |

FOREIGN PATENT DOCUMENTS

| | | |
|---|---|---|
| EP | 0 493 773 | 7/1992 |
| WO | WO 93/13974 | 7/1993 |

* cited by examiner

*Primary Examiner*—Avraham H. Lerner
(74) *Attorney, Agent, or Firm*—Oblon, Spivak, McClelland, Maier & Neustadt, P.C.

(57) ABSTRACT

A rear suspension for a bicycle. A bottom fork is mounted pivotally at the bicycle frame bottom bracket and its other end is mounted at the top fork. The bottom fork bears a wheel which is driven in rotation by a chain. The top end of the top fork is pivotally mounted at the end of an arm, the other end of which is pivotably mounted to the frame. The vertices of the articulated quadrilateral defined by the top and bottom forks, the arm and the frame are arranged so that a straight line passing through the rear wheel hub rotation axis and the center of curvature of the hub path during the suspension travel forms an angle ranging between 10–° with the horizontal straight line extending parallel to the bicycle median longitudinal plane.

12 Claims, 2 Drawing Sheets

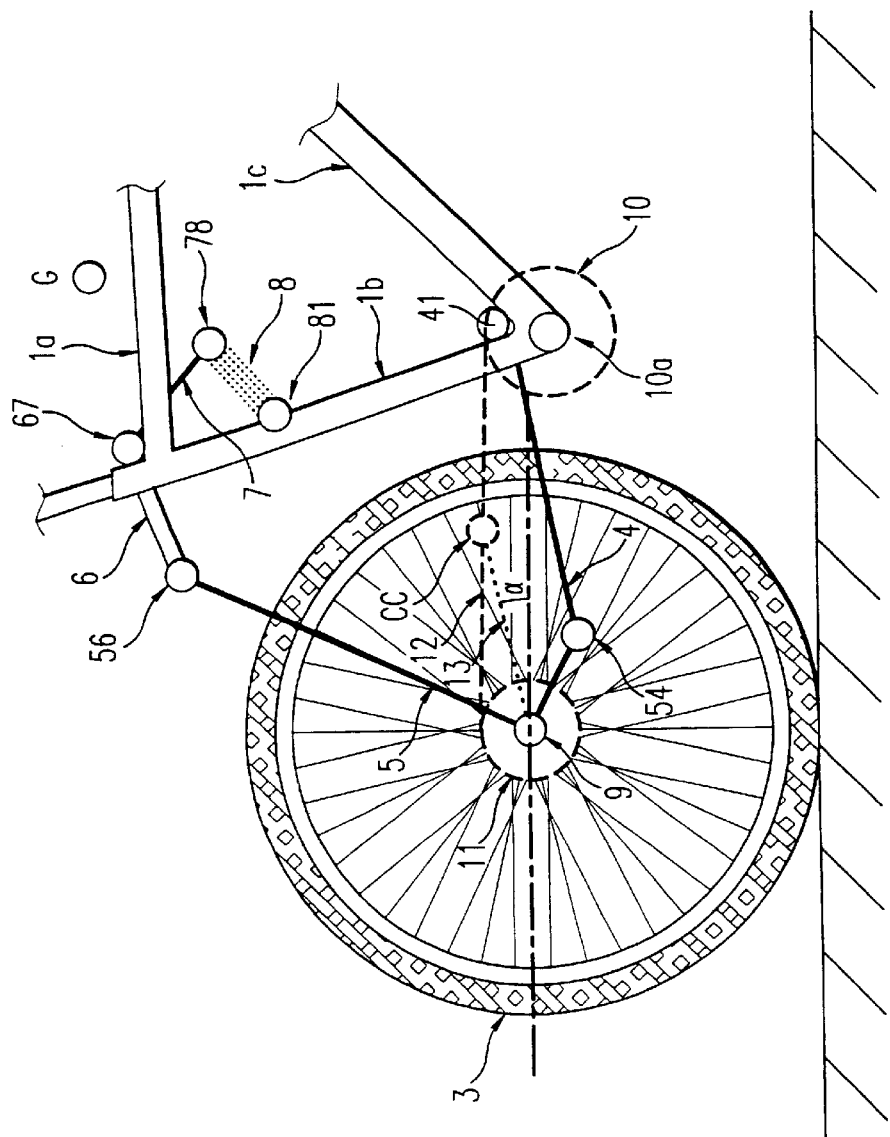

BICYCLE REAR SUSPENSION

BACKGROUND OF THE INVENTION

1. Field of the Invention

The invention concerns a bicycle rear suspension intended, notably for off-road operation.

2. Discussion of the Background

The rear wheels of this type of bicycle are generally connected to the bicycle frame by shock absorption means in both rear and front, in order to reduce the intensity of the forces and vibrations transmitted to the cyclist, which ensures improved comfort as well as better control of the bicycle.

U.S. Pat. No. 3,931,990 describes a bicycle with oscillating suspension of the rear wheel, connected to a spring and to a shock absorber. With such a suspension, only a fraction of the power delivered by the cyclist on each pedal stroke is used for forward movement of the bicycle, the complementary fraction being lost on compression of the rear suspension resulting from the transfer of weight.

SUMMARY OF THE INVENTION

The invention concerns, more particularly, a bicycle rear suspension, of the type comprising a lower fork pivotally mounted in the crank gear case of a bicycle frame, and at its other end an upper fork, which bears a wheel driven in rotation by a chain, and the upper end of which is pivotally mounted on the end of an arm whose other end is pivotally mounted on the frame.

Thus, by positioning the pivoting points of the lower and upper forks in the manner described, the compression of the suspension resulting from the transfer of weight on pedaling is not only neutralized, but even overcompensated, which secures, among other advantages, preservation of all of the shock absorption potential of the suspension.

For that purpose, the suspension according to the invention is characterized in that the vertices of the articulated quadrilateral delimited by the lower and upper forks, the arm and the frame are so arranged that the straight line passing through the axis of rotation of the hub of the rear wheel, on the one hand, and the center of curvature of the path of said hub on clearance of the suspension, on the other, forms with a horizontal line extending parallel to the median longitudinal plane of the bicycle an angle ranging between 10° and 20°.

According to another characteristic of this invention, the straight line passing through the axis of rotation of the hub of the rear wheel, on the one hand, and the center of curvature of the path of said hub on clearance of the suspension, on the other, forms with a horizontal line extending parallel to the median longitudinal plane of the bicycle an angle roughly equal to 14°.

According to another characteristic of this invention, the center of curvature of the path of the hub of the rear wheel is situated in proximity to the horizontal plane containing the upper part of the drive chain of the wheel.

According to another characteristic of this invention, the arm is all in one piece with a control lever of a shock absorption assembly.

According to another characteristic of this invention, the arm and the lever extend in directions forming an obtuse angle between them.

According to another characteristic of this invention, a shock absorption assembly is inserted between the saddle tube and the end of the lever opposite the pivoting point.

According to another characteristic of this invention, the pivoting point of the lower fork on the frame is situated above the axis of the crank gear case.

According to another characteristic of this invention, the pivoting point of the lower fork on the frame is situated in front of the axis of the crank gear case.

According to another characteristic of this invention, the pivoting point of the lower fork on the frame is placed above a horizontal line passing through the axes of rotation of the front and rear wheels.

According to another characteristic of this invention, the connecting point of the lower fork and upper fork is situated above a horizontal line passing through the axis of the crank gear case.

According to another characteristic of this invention, the connecting point of the upper fork and arm is placed in front of the point and above the latter.

According to another characteristic of this invention, the pivoting point, common to the lever and arm on the frame, is situated behind the point.

BRIEF DESCRIPTION OF THE DRAWINGS

The objects, aspects and characteristics of this invention will be better understood from the description given below of an embodiment of the invention, presented by way of nonlimitative example, referring to the attached drawings, in which:

FIG. 2 is a detailed view of FIG. 1.

DETAILED DESCRIPTION OF THE PREFERRED EMBODIMENTS

Figure 1:
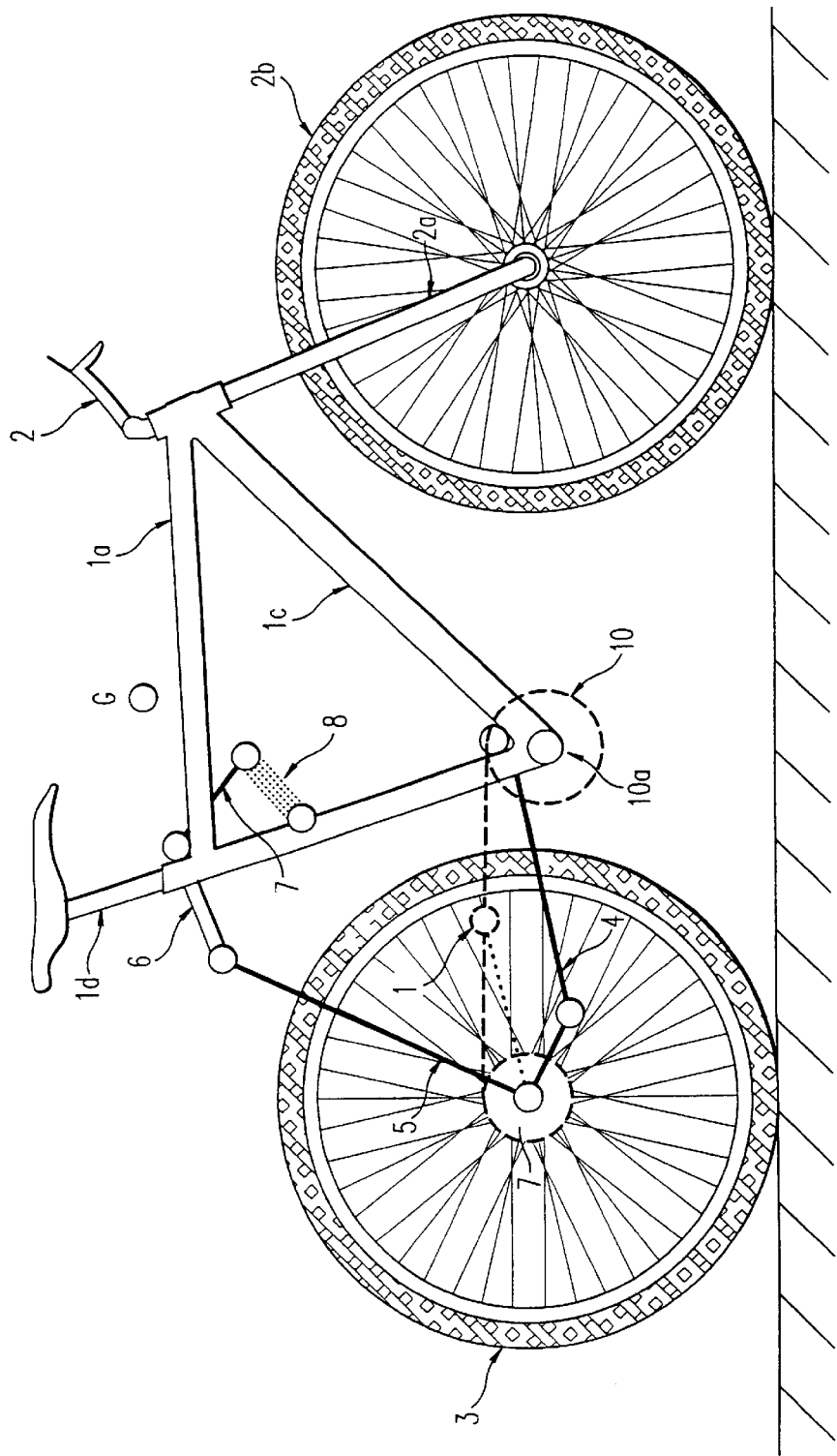
FIG. 1 is a side elevational view of a bicycle equipped with a suspension according to this invention.

A preferred embodiment of the invention is described below with reference to the drawings, in which reference 1 designates a bicycle frame and reference 3 designates the rear wheel of the bicycle.

The frame 1 comprises a saddle tube 1b, a horizontal upper tube and a diagonal tube 1c; those three members are rigidly joined together in known manner to form a triangular structure.

The saddle tube 1b, in which the saddle 1d slides, and the diagonal tube 1c are connected by an axle crank gear case 10a; a steering tube, which supports the front steering fork bearing a front wheel 2b, connects the horizontal upper tube 1a and the diagonal tube 1c; the saddle tube 1b and the diagonal upper tube are connected by a saddle coupling.

The rear wheel 3 is connected to the frame 1 by an articulated structure defining a quadrilateral with the saddle tube 1b. That articulated quadrilateral, contained in a plane roughly parallel to the longitudinal vertical median plane of the bicycle, contains pivoting points 41, 54, 56, 67 and sides 6, 5, 4, 1b.

The moving part of the quadrilateral embraces an upper fork 5, a lower fork 4 and an arm 6.

The upper fork is pivotally joined at one of its ends to one of the ends of the arm 6 and is joined all in one piece at its other end to a rear wheel axle bearing.

The lower fork 4 is pivotally joined respectively to the crank gear case at its front end and to the upper fork 5.

The upper fork 5, all in one piece, contains two branches attached to a common axle bearing 9 of the rear wheel 3, from which they extend upward and downward respectively in directions forming between them an angle greater than 90°; a stiffening cross bar connects the two branches of the fork 5.

The pivoting axes of the different components of the quadrilateral extend at right angles to the bicycle.

The rear wheel axle bearing 9 receives the rear wheel, only one of the toothed wheels 11 of which has been represented.

The crank gear case receives the crank gear, only one of the chain wheels 10 of which has been represented.

The rear wheel 3 is driven by means of a drive chain 12, only the useful upper part of which has been represented, passing around the toothed wheel 11 of the rear wheel and around the chain drive wheel 10.

A shock absorption assembly 18, consisting, for example, of an elastomer element, is pivotally joined at its ends to a lever 7 and to the frame 1, respectively. The hardness of the elastomer is chosen according to the needs, but that elastomer element can also be prestressed, for example, by a toothed wheel turning on an elastomer support rod. The elastomer is preferably fitted on the rod between two retainers.

The shock absorption assembly can also consist of a standard spring-shock absorber combination.

The shock absorption assembly is preferably prestressed so that the suspension is set at high stop when the bicycle is immobile and the cyclist is in a seated position.

The lever 7 is integrated with the arm 6 via a connecting member 78, those two members being pivotally mounted on the frame 1 about a common axis passing through point 67.

In the course of description of a preferred embodiment of the invention, the vertical positioning of particular points of the bicycle will be specified, assuming that the bicycle is resting on its wheels on a horizontal surface; as for the longitudinal positioning of those points, it is to be considered along an axis oriented in the direction of normal movement of the bicycle.

The pivoting point 41 of the lower fork on the bicycle frame is placed above a horizontal line passing through the axes of rotation of the front and rear wheels and/or above a horizontal line passing through the axis of the crank gear case 10*a*. Point 41 is further placed in front of the axis 10*a* of the crank gear case.

The connecting point 54 of the lower fork 4 and upper fork 5 is situated above a horizontal line passing through the axis of the crank gear case.

The connecting point 56 of the upper fork and of the arm 6 is placed in front of point 54 and above the latter.

The pivoting point 67 common to the lever 7 and to the arm 6 on the bicycle frame is situated behind point 41.

Such quadrilateral defines a center of curvature (CC) of the path of the hub, situated in proximity to the drive chain, which notably has the advantage of limiting the variation of length of the useful part of the chain 1 on clearance of the suspension.

The straight line 13 passing through the center of curvature (CC) of the hub of the rear wheel 3, on the one hand, and the axis of said hub, on the other, extends in a direction forming an acute angle with the horizontal, ranging between 10° and 20°; preferably, that angle, measured directly, is appreciably equal to 14°.

When the bicycle is equipped with several rear toothed wheels and several chain wheels, the position of the center of curvature (CC) of the path of the hub of the rear wheel is chosen so as to minimize the distance between the projection in a vertical plane, in a direction at right angles to the bicycle, of that center of curvature and of the set of chain lines.

The suspension according to the invention is simple to manufacture, in that it only employs a deformable arrangement with four pivots, that quadrilateral configuration further making it possible to secure sufficient transverse rigidity of the bicycle.

The geometry of the proposed rear suspension makes it possible to obtain, on pedaling, a vertical resultant of forces exerted on the rear wheel directed downward; in other words, the rear suspension tend to be slightly raised on pedaling The proposed geometry, associated with a high-stop adjustment of the shock absorption assembly, makes possible an optimal use of the mechanical energy supplied by the cyclist on pedaling, almost all of the power delivered on pedaling being used for forward movement of the bicycle. Pedaling efficiency is thereby considerably augmented.

A bicycle equipped with such a suspension can use a very rigid frame and wheels, for those components then no longer have a comfort role to play, and without detriment to the cyclist's comfort.

What is claimed is:

1. A bicycle rear suspension, which comprises:

crank gear case means;

frame means on which the crank gear case means is mounted, said frame means having an arm extending therefrom, said frame means including an upper tube, a saddle tube connected to said upper tube and a diagonal tube connected to said saddle tube;

lower fork means pivotally mounted at a first end thereof to said frame means;

upper fork means connected to a second end of said lower fork means, said upper fork means having axle bearing means mounted thereon which is driven in rotation by a chain of the bicycle wherein the upper fork means has an upper end which is pivotally connected to said arm of said frame means wherein said lower fork means, said upper fork means, said arm and said saddle tube form an articulated quadrilateral such that a straight line passing through an axis of rotation of a hub of the rear wheel, on the one hand, and a center of curvature of a path of said hub on the clearance of the suspension, on the other hand, forms with respect to a horizontal line extending parallel to a median longitudinal plane of the bicycle, an angle ranging between 10° and 20°, and wherein the suspension is prestressed so as to be set at a high stop position when the cycle is immobilized and a cyclist is in a seated position thereon.

2. A bicycle rear suspension according to claim 1, wherein the straight line passing through the axis of rotation of the hub of the rear wheel, on the one hand, and the center of curvature of the path of said hub on clearance of the suspension, on the other, forms with a horizontal line extending parallel to the median longitudinal plane of the bicycle an angle substantially equal to 14°.

3. A bicycle rear suspension according to claim 1, wherein the center of curvature of the path of the hub of the rear wheel is situated in proximity with the horizontal plane containing the upper part of the wheel drive chain.

4. A bicycle rear suspension according to claim 3, which comprises control lever means for a shock absorption assembly wherein the arm is unitarily formed with said control lever means.

5. A bicycle rear suspension according to claim 4, wherein the arm and the control lever means extend in directions forming an obtuse angle therebetween.

6. A bicycle rear suspension according to claim 4, which comprises a shock absorption assembly positioned between the saddle tube and an end of the control lever means opposite the pivoting point and the pivoting point of said control lever means is positioned above said saddle tube.

7. A bicycle rear suspension according to claim 1, wherein the connecting point of the lower fork and of the upper form is situated above a horizontal line passing through the axis of the crank gear case means.

8. A bicycle rear suspension according to claim 1, wherein a connecting point of the upper fork and said arm is placed in front of and above the connecting point.

9. A bicycle rear suspension according to claim 3, wherein the lever and the arm on the frame means have a common point which is situated behind the pivoting point of the lower fork on the frame means and above said upper tube.

10. A bicycle rear suspension according to claim 1, wherein a pivoting point of the lower fork on the frame means is situated above an axis of the crank gear case means.

11. A bicycle rear suspension according to claim 10, wherein the pivoting point of the lower fork on the frame means is situated in front of the axis of the crank gear case means.

12. A bicycle rear suspension according to claim 10, wherein the lower pivoting point of the lower fork on the frame means is positioned above a horizontal line passing through the axis of rotation of the front wheel and a rear wheel of the bicycle.

* * * * *